United States Patent
Huang et al.

(10) Patent No.: US 9,419,717 B2
(45) Date of Patent: Aug. 16, 2016

(54) REPLACEABLE TRANSMITTING MODULE AND OPTICAL TRANSCEIVER HAVING THE SAME

(71) Applicant: LuxNet Corporation, Zhongli, Taoyuan County (TW)

(72) Inventors: Yun-Cheng Huang, Zhongli (TW); Chung-Hsin Fu, Zhongli (TW); Huang-Shen Lin, Zhongli (TW); Yi-Ping Hung, Zhongli (TW); Nai-Hsin Chen, Zhongli (TW); Chi-Min Ting, Zhongli (TW); Chien-Hua Chiu, Zhongli (TW)

(73) Assignee: LUXNET CORPORATION, Zhongli, Taoyuan County (TW)

( * ) Notice: Subject to any disclaimer, the term of this patent is extended or adjusted under 35 U.S.C. 154(b) by 21 days.

(21) Appl. No.: 14/304,570

(22) Filed: Jun. 13, 2014

(65) Prior Publication Data

US 2015/0256259 A1    Sep. 10, 2015

(30) Foreign Application Priority Data

Mar. 10, 2014 (TW) .............. 103204033 U (51) Int. Cl.
*H04B 10/40* (2013.01)
*G02B 6/42* (2006.01)
*G01J 1/02* (2006.01)
*G01J 1/04* (2006.01)
*H04B 10/25* (2013.01)
*H04B 10/50* (2013.01)
*H04J 14/02* (2006.01)

(52) U.S. Cl.
CPC .............. *H04B 10/40* (2013.01); *G01J 1/0271* (2013.01); *G01J 1/0425* (2013.01); *G02B 6/4246* (2013.01); *G02B 6/4261* (2013.01); *G02B 6/4278* (2013.01); *G02B 6/4292* (2013.01); *H04B 10/2504* (2013.01); *H04B 10/506* (2013.01); *H04J 14/02* (2013.01)

(58) Field of Classification Search
CPC ........ H04B 10/40; H04B 10/43; H04B 10/50; H04B 10/501; H04B 10/506; H04B 10/2504; G02B 6/4278; G02B 6/4246; G02B 2/4214; G02B 2/4292
USPC .................................................. 398/135–139
See application file for complete search history.

(56) References Cited

U.S. PATENT DOCUMENTS

| | | | | |
|---|---|---|---|---|
| 5,784,183 A | * | 7/1998 | Aoki ...................... | B82Y 20/00 398/79 |
| 6,769,816 B2 | * | 8/2004 | Capewell ........... | G02B 6/29367 385/24 |
| 6,954,592 B2 | * | 10/2005 | Tan ...................... | G02B 6/4206 398/135 |
| 7,184,621 B1 | * | 2/2007 | Zhu .................... | G02B 6/29361 385/24 |

(Continued)

*Primary Examiner* — Li Liu
(74) *Attorney, Agent, or Firm* — Muncy, Geissler, Olds & Lowe, P.C.

(57) ABSTRACT

A replaceable transmitting module is disposed on an optical connector. The replaceable transmitting module comprises a plurality of optical sub-assemblies disposed independently respectively, and at least one positioning mount disposed on the optical connector. The optical sub-assemblies comprises at least one edge-emitting laser diode, a second cover disposed on the edge-emitting laser diode, and a second lens disposed on the second cover and corresponding to the edge-emitting laser diode. The positioning mount comprises a base and a plurality of positioning portions which are disposed on the base and to fix the optical sub-assemblies, respectively.

17 Claims, 9 Drawing Sheets

(56) References Cited

U.S. PATENT DOCUMENTS

| | | | | |
|---|---|---|---|---|
| 7,203,426 B2* | 4/2007 | Wu | G02B 6/4246 | 359/199.1 |
| 7,369,776 B2* | 5/2008 | Masahiko | H04B 10/40 | 398/135 |
| 7,583,900 B2* | 9/2009 | Dallesasse | G02B 6/4201 | 398/135 |
| 7,995,928 B2* | 8/2011 | Du | G02B 6/29362 | 398/135 |
| 8,160,451 B2* | 4/2012 | Liu | G02B 6/4201 | 398/135 |
| 8,488,244 B1* | 7/2013 | Li | G02B 27/1006 | 359/618 |
| 8,540,437 B2* | 9/2013 | Lee | G02B 6/4215 | 385/31 |
| 8,625,989 B2* | 1/2014 | Du | G02B 6/4215 | 398/43 |
| 8,995,845 B2* | 3/2015 | Du | H04B 10/40 | 385/24 |
| 2002/0110328 A1* | 8/2002 | Bischel | G02B 6/4201 | 385/49 |
| 2003/0174953 A1* | 9/2003 | Carnevale | G02B 6/4472 | 385/39 |
| 2004/0218854 A1* | 11/2004 | Lemoff | G02B 6/2848 | 385/24 |
| 2006/0088255 A1* | 4/2006 | Wu | G02B 6/2938 | 385/92 |
| 2006/0165366 A1* | 7/2006 | Feustel | G02B 6/2804 | 385/135 |
| 2008/0095541 A1* | 4/2008 | Dallesasse | H04B 10/40 | 398/191 |
| 2009/0052898 A1* | 2/2009 | Oki | G02B 6/4246 | 398/79 |
| 2010/0008675 A1* | 1/2010 | De Dobbelaere | H04B 10/40 | 398/135 |
| 2010/0061730 A1* | 3/2010 | Seki | G02B 6/4246 | 398/79 |
| 2010/0067854 A1* | 3/2010 | Oki | H01R 13/748 | 385/92 |
| 2011/0058771 A1* | 3/2011 | Lee | G02B 6/4215 | 385/33 |
| 2011/0229096 A1* | 9/2011 | Oki | G02B 6/4201 | 385/92 |
| 2012/0148254 A1* | 6/2012 | Yamauchi | H04B 10/40 | 398/135 |
| 2012/0175502 A1* | 7/2012 | Yu | G02B 6/4292 | 250/208.2 |
| 2012/0189254 A1* | 7/2012 | Wang | G02B 6/4292 | 385/93 |
| 2012/0189314 A1* | 7/2012 | Xu | H04B 10/506 | 398/135 |
| 2013/0142490 A1* | 6/2013 | Teo | G02B 6/4277 | 385/92 |
| 2013/0308909 A1* | 11/2013 | Barnette, Jr. | G02B 6/3849 | 385/78 |
| 2014/0161459 A1* | 6/2014 | Ho | H04B 10/40 | 398/79 |
| 2014/0219609 A1* | 8/2014 | Nielson | G02B 6/46 | 385/54 |
| 2015/0256261 A1* | 9/2015 | Ho | H04B 10/503 | 398/139 |

* cited by examiner

REPLACEABLE TRANSMITTING MODULE AND OPTICAL TRANSCEIVER HAVING THE SAME

CROSS-REFERENCE TO RELATED APPLICATION

This application claims the benefit of Taiwan Patent Application No. 103204033, filed on Mar. 10, 2014, in the Taiwan Intellectual Property Office, the disclosure of which is incorporated herein in its entirety by reference.

BACKGROUND OF THE INVENTION

1. Field of the Invention

The present invention is related to an optical transceiver, more particularly, to an optical transceiver in which the transmitting module is divided into a plurality of optical sub-assemblies independently disposed.

2. Description of the Related Art

As science and technology are updated rapidly, processing speed and capacity of the computer increase correspondingly. The communication transmission using the traditional cable is limited to bandwidth and transmission speed of the traditional cable, so mass information transmission required in modern life causes the traditional communication transmission overload. To correspond to such requirement, the optical fiber transmission system replaces the traditional communication transmission system gradually. The optical fiber transmission system does not have bandwidth limitation, and also has advantages of high speed transmission, long transmission distance, and its material not interfered by the electromagnetic wave. Therefore, present electronic industrial performs research toward optical fiber transmission which will become the mainstream in the future. Said optical communication is a technology in that light wave functions as signal carrier and is transmitted between two nodes via the optical fiber. Field of the optical communication can be divided into optical communication side and electric communication side according to transmission medium. By the optical transceiver, the received optical signal can be converted to an electrical signal capable of being processed by an IC, or the processed electrical signal can be converted to the optical signal to be transmitted via an optical fiber. Therefore, objective of communication can be achieved.

Wavelength-division multiplexing (WDM) is a multitask technology of processing multiple optical carrier signals transmitted by the optical fiber, and this technology applies different wavelength signal or laser optical signal for transmission. This technology is implemented in bidirectional transmission of signal on the optical fiber to double transmission capacity. Besides, the term "wavelength-division multiplexing" is mostly applied in optical carrier, and frequency-division multiplexing is applied in radio carrier. Moreover, both of wavelength and frequency are in reciprocal relationship, so their concept can be applied to each other.

Actually, wavelength-division multiplexing is implemented by dividing the work wavelength of the optical fiber into multiple channels to enable mass data transmission in one optical fiber. Whole wavelength-division multiplexing system can be divided into a wavelength division multiplexer at transmitting end and a wavelength division demultiplexer at receiving end. At present, there are commercial wavelength division multiplexer/demultiplexer which can divide 80 channels for the optical fiber communication system, so that the data transmission speed can exceed grade of Tb/s effectively.

In the transmitting module adapted for WDM technology, the connector usually has single light transmitter structure. Such light transmitter structure can emit optical signals with different frequencies, but cannot be repaired for just individual frequency and whole light transmitter must be replaced if being damaged, and it causes larger consumption in cost.

SUMMARY OF THE INVENTION

The objective of the present invention is to solve the problem that single light transmitter must be replaced wholly when being damage.

To solve the problem in prior art, the present invention provides an optical transceiver installed with a replaceable transmitting module. The optical transceiver comprises a casing, a circuit board disposed within the casing, an optical receiving module connected to the circuit board, a transmitting module connected to the circuit board, and a connector connected to the optical receiving module and the transmitting module to receive and transmit the optical signal. The optical receiving module comprises an photo diode array consisted of a plurality of photo diodes, a first cover disposed on the photo diode array, and a plurality of first lenses disposed on the first cover and corresponding to the photo diodes respectively. The transmitting module comprises a plurality of optical sub-assemblies disposed independently respectively, and at least one positioning mount disposed on the casing. The optical sub-assemblies comprise at least one edge-emitting laser diode, a second cover disposed on the edge-emitting laser diode, and a second lens disposed on the second cover and corresponding to the edge-emitting laser diode. The positioning mount comprises a base and a plurality of positioning portions which are disposed on the base and to fix the optical sub-assemblies, respectively.

Preferably, the connector comprises a light input port and a light output port, and the optical receiving module comprises a splitting demultiplexer coupled to the first lens and splitting an optical signal transmitted from the light input port and carrying different wavelength, and transmitting the split optical signal to the photo diode, so that the optical receiving module receives the optical signal.

Preferably, the optical receiving module comprises a main optical fiber and a plurality of secondary optical fibers, and two ends of the main optical fiber are coupled to the light input port and the splitting demultiplexer, and the plurality of secondary optical fibers are coupled to the first lens and the splitting demultiplexer, respectively.

Preferably, the connector comprises a light input port and a light output port, and the transmitting module comprises a splitting multiplexer coupled to the second lens and transmitting optical signals of different wavelengths from the edge-emitting laser diode to the light output port for transmitting the optical signal.

Preferably, the transmitting module comprises a main optical fiber and a plurality of secondary optical fibers, and two ends of the main optical fiber are coupled to the light output port and the splitting multiplexer, and the plurality of secondary optical fibers are coupled to the second lens and the splitting multiplexer, respectively.

Preferably, the connector comprises a connector body, a plurality of mating passages disposed on the connector body, and a fixing portion disposed at two sides of the mating passage for positioning an external cable.

Preferably, the transmitting module comprises a plurality of internal optical fibers coupled to the second lens and the mating passages, respectively.

Preferably, the second cover comprises a main part covering the edge-emitting laser diode and at least one cylindrical element connected to one side of the main part and corresponding to the edge-emitting laser diode, and the at least one cylindrical element is provided with the second lens.

Preferably, the main part comprises a first connection part and the cylindrical element comprises a second connection part for being combined with the first connection part correspondingly.

Preferably, the positioning portion is a slot for being inserted by the cylindrical element.

Preferably, the plurality of first covers of the optical receiving module are disposed above the photo diode array respectively, and the optical receiving module comprises a reflecting mirror disposed on the first cover above the photo diode array, and the reflecting mirror deflects the optical signal from the first lens by 90 degrees and couples the deflected optical signal to the photo diode array.

Preferably, the plurality of first covers of the optical receiving module are disposed above the photo diode, and comprise reflecting mirrors disposed on first cover above the photo diode respectively, and the reflecting mirrors deflect the optical signals from the first lens by 90 degrees and couple the deflected optical signal to the photo diode array.

Preferably, the optical receiving module comprises a window located on the first cover above the reflecting mirror.

Another aspect of the present invention is to provide a replaceable transmitting module, disposed on an optical connector, the replaceable transmitting module comprising: a plurality of optical sub-assemblies, disposed independently respectively, and each of the optical sub-assemblies comprising at least one edge-emitting type laser diode, a second cover disposed on the edge-emitting type laser diode, and a second lens disposed on the second cover and corresponding to the edge-emitting type laser diode; and at least one positioning mount, disposed on the optical connector, the positioning mount comprising a base, and a plurality of positioning portions disposed on the base and fixing the optical sub-assemblies respectively.

Preferably, the second cover comprises a main part covering the edge-emitting laser diode, and at least one cylindrical element connected to one side of the main part and corresponding to the edge-emitting laser diode, and the at least one cylindrical element is provided with the second lens.

Preferably, the main part comprises a first connection part and the cylindrical element comprises a second connection part for correspondingly being combined with the first connection part.

Preferably, the positioning portion is a slot for being inserted by the cylindrical element.

Therefore, compared to the prior art, the present invention has the following advantages.

First, the optical sub-assembly of the present invention can be detached independently, so that assembly engineer can replace single optical sub-assembly in failure.

Secondly, the main part and the cylindrical element of optical sub-assembly of the present invention can be detached individually, so that the cylindrical element provided with the second lens can be recycled for reuse when the edge-emitting laser diode is damaged.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

Reference will now be made in detail to the exemplary embodiments of the present disclosure, examples of which are illustrated in the accompanying drawings. These exemplary embodiments are provided so that this disclosure will be thorough and complete, and will fully convey the scope of the invention to those skilled in the art. The drawing used herein is for the purpose of describing particular embodiments only and is not intended to be limiting of the invention. Wherever possible, the same reference numbers are used in the drawings and the description to refer to the same or like parts.

Figure 1:
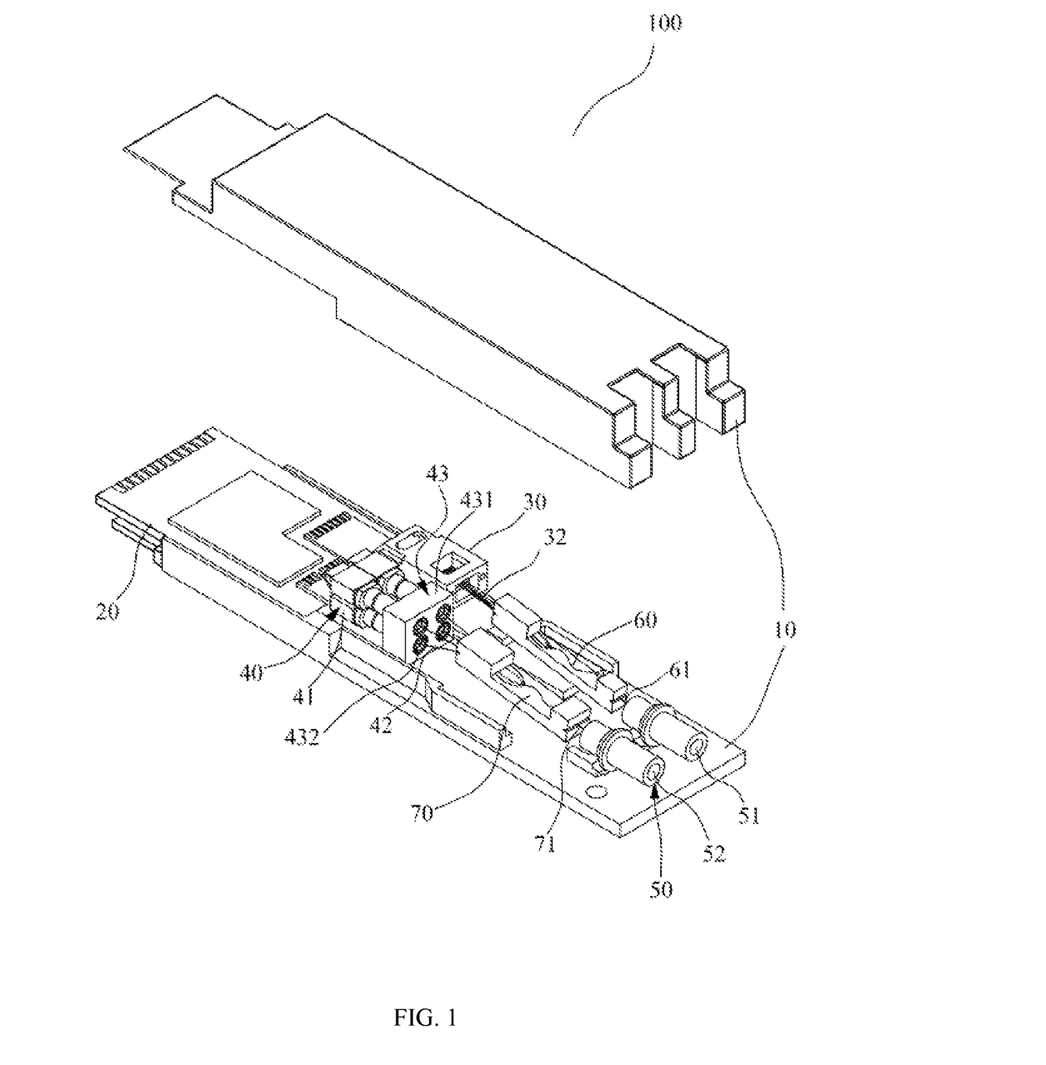
FIG. 1 is a schematic view of a first embodiment according to the present invention.
Figure 2:
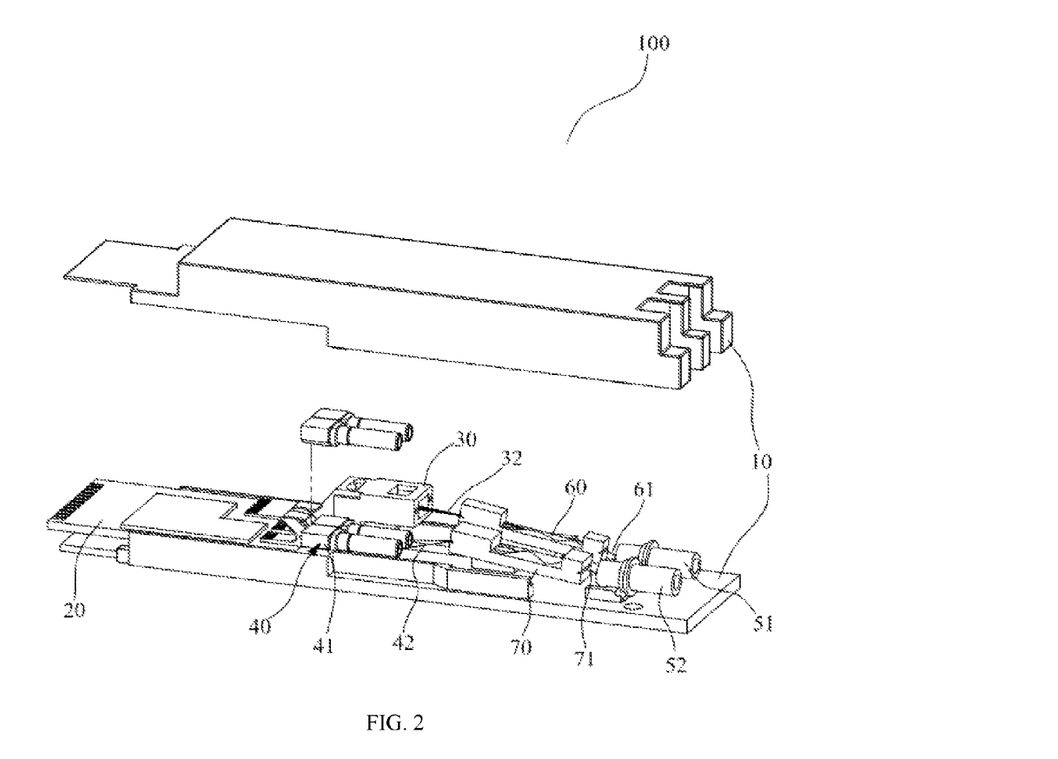
FIG. 2 is an exploded view of partial structure of the first embodiment according to the present invention.

Please refer to both of FIG. 1 and FIG. 2 which are schematic view of a first embodiment and exploded view of partial structure of the first embodiment according the present invention, respectively. As shown in FIG. 1 and FIG. 2, the optical transceiver in this embodiment applies technology of wavelength-division multiplexing, a plurality of edge-emitting laser diodes introduce light of different wavelengths to one single-mode optical fiber via wavelength-division multiplexer respectively, for middle distance and long distance transmission in the single-mode optical fiber. Next, in the optical transceiver at the other side, the received optical signal is performed a light-split process by the demultiplexer and the split optical signals are introduced to different channels. In this embodiment, except WDM technology, the optical transceiver also can be applied to related optical communication technologies, such as binary phase shift keying modulation (BPSK), quadrature phase shift keying modulation (QPSK), conventional/coarse wavelength division multiplexing (CWDM), dense wavelength division multiplexing (DWDM), optical add/drop multiplexer (OADM), and reconfigurable optical add/drop multiplexer (ROADM). The optical transceiver 100 of the present invention is configured with the QSFP standard. The optical transceiver 100 comprises a casing 10, a circuit board 20 disposed within the casing 10, an optical receiving module 30 connected to the circuit board 20, a transmitting module 40 connected to the circuit board 20, and a connector 50 connected to the optical receiving module 30 and the transmitting module 40.

The casing 10 may accommodate and fix electronic circuit components, such as the circuit board 20, the optical receiving module 30, the transmitting module 40 and the connector 50. Related circuit components corresponding to the optical receiving module 30 and the transmitting module 40 are disposed on the circuit board 20, for example, power factor correction circuit, detection circuit, driving circuit or signal process circuit for processing signal. The optical receiving module 30 and the transmitting module 40 are connected to the circuit board 20 for the optical-to-electrical conversion. The optical receiving module 30 converts the optical signal received by the photo diode 31 to the electrical signal. The transmitting module 40 comprises a plurality of optical sub-assemblies 41 disposed independently respectively, and at least one positioning mount 42 disposed on the casing 10. The connector 50 is connected to the optical receiving module 30 and the transmitting module 40, to receive and transmit the optical signal.

In order to modulate and demodulate the multiple sets of optical signals from the transmitting module 40 and the optical receiving module 30 for coupling the beams of different wavelengths to a single mode optical fiber via a plurality of optical fibers, or for demodulating beams of different wavelengths from a single mode optical fiber to a plurality of optical fiber channel, the transmitting module 40 comprises a splitting multiplexer 70 and the optical receiving module 30 comprises a splitting demultiplexer 60, and the WDM technology is utilized in this embodiment. The splitting multiplexer 70 is disposed on one side of the transmitting module 40, and the light signals of different wavelengths generated by the transmitting module 40 are coupled to the splitting multiplexer 70 via a plurality of secondary optical fibers 42 connected to the transmitting module 40. The splitting multiplexer 70 transmits the light signals of different wavelengths from the secondary optical fibers 42 to a main optical fiber 71, respectively. The optical signals are then transmitted to the connector 60 via the main optical fiber 71. The splitting demultiplexer 60 is disposed on one side of the optical receiving module 30, and demodulates the optical wave of different wavelengths received by the connector 50 via the main optical fiber 61, so as to transmit light signals of different wavelengths to the secondary optical fiber 32, respectively. The splitting multiplexer 70 and the splitting demultiplexer 60 can use discrete micro-optic, optical waveguide or other like manner to couple the optical signal from the secondary optical fiber 42 to the main optical fiber 71, or spilt the optical signal from the main optical fiber 61 and transmits the split optical signals to the secondary optical fiber 32, respectively.

The connector 50 is connected to the splitting multiplexer 70 and the splitting demultiplexer 60, in order to connect the transmitting module 40 and optical receiving module 30 to an external optical cable which is not shown in figures. The connector 50 comprises a light input port 51 and a light output port 52. The light input port 51 is connected to the optical receiving module 30 for transmitting the optical signal from the external optical cable to the optical receiving module 30. The light output port 52 is connected to the transmitting module 40 for transmitting the optical signal emitted from the transmitting module to the external optical cable. In this embodiment, the connector 50 is configured with standard of Lucent Connector/Local Connector, but it is not limited thereto.

Figure 3:
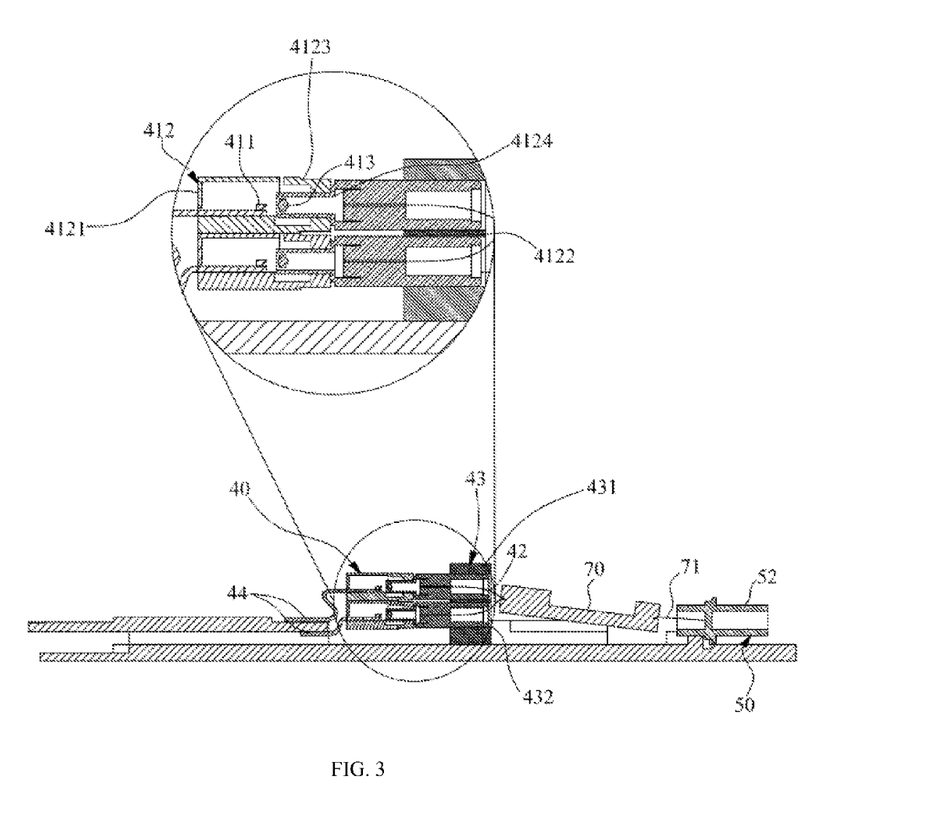
FIG. 3 is a first section view of the first embodiment according to the present invention.

Please refer to FIG. 3 which is a first section view of the first embodiment according to the present invention, for detail structure of the transmitting module.

The transmitting module 40 comprises a plurality of optical sub-assemblies 41 disposed independently respectively, and at least one positioning mount 43 disposed on the casing 10. The positioning mount 43 comprises a base 431 and a plurality of positioning portions 432 which are disposed on the base 431 and to fix the optical sub-assemblies 41 respectively. When one optical sub-assembly 41 does not work, the assembly engineer can detach the optical sub-assembly 41 from the positioning portion 432 directly for replacing the optical sub-assembly 41. The optical sub-assemblies comprises at least one edge-emitting laser diode 411, a second cover 412 disposed on the edge-emitting laser diode 411, a second lens 413 disposed on the second cover 412 and corresponding the edge-emitting laser diode 411, and a flexible PCB 44 connected with the edge-emitting laser diode 411 and the circuit board 20. Two ends of the main optical fiber 71 are coupled to the light output port 52 and the splitting multiplexer 70, respectively. Two ends of the secondary optical fiber 42 are coupled to the second lens 413 and the splitting multiplexer 70, respectively. The second cover 412 comprises a main part 4121 covering the edge-emitting laser diode 411 and at least one cylindrical element 4122 connected to one side of the main part 4121 and corresponding to the edge-emitting laser diode 411. The cylindrical element 4122 is provided with the second lens 413. The positioning portion 432 is a slot for being inserted by the cylindrical element 412. The main part 4121 comprises a first connection part 4123 and the cylindrical element 4122 comprises a second connection part 4124 for correspondingly being combined with the first connection part 4123. The cylindrical element 4122 and the main part 4121 can be combined together or be detached by the first connection part 4123 and the second connection part 4124. When the edge-emitting laser diode within the main part 4121 or the second lens 413 on the cylindrical element 4122 is damaged, the damaged cylindrical element 4122 or the main part 4121 can be replaced individually. Therefore, the manufacturing cost can be reduced.

Figure 4:
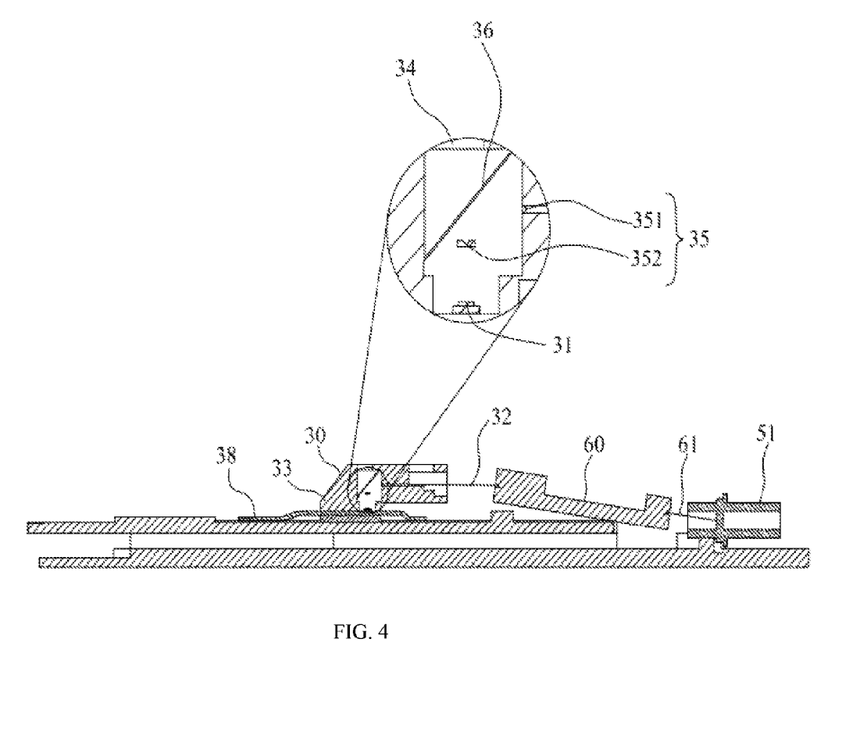
FIG. 4 is a second section view of the first embodiment according to the present invention.

Please refer to FIG. 4 which is a second section view of the first embodiment according to the present invention, for detail structure of the optical receiving module.

The optical receiving module 30 comprises an photo diode array consisted of a plurality of photo diodes 31, a first cover 33 disposed on the photo diode array, a reflecting mirror 36 disposed on the first cover 33 above the photo diode array, a window 34 disposed on the first cover 33 above the reflecting mirror 36, a plurality of first lenses 35 disposed on the first cover 33 respectively and corresponding to photo diodes 31 respectively, and a flexible PCB 38 connected to the photo diodes 31 and the circuit board 20. The first lens 35 can be divided into a first set of first lens 351 and a second set of first lens 352. The first set of first lens 351 is disposed between the secondary optical fiber 32 and the reflecting mirror 36 for converting the diffuse light transmitted form the secondary optical fiber 32 into parallel light. The second set of first lens 352 is disposed between the reflecting mirror 36 and photo diode 31 to converge the parallel light on the photo diode 31. Two ends of the main optical fiber 61 are coupled to the light input port 51 and the splitting demultiplexer 60, respectively. Two ends of the secondary optical fiber 32 are coupled to the first lens 35 and the splitting demultiplexer 60, respectively.

Please refer to FIG. 1 to FIG. 4 for operation of the optical transceiver according to the present invention.

In one side of the transmitting module 40, optical signals are emitted by different edge-emitting laser diodes 411 respectively, and coupled to the secondary optical fibers 42 respectively via second lenses 413 and different channels, so as to transmit the optical signals to the splitting multiplexer 70 via different channels. After receiving the optical signals, the splitting multiplexer 70 transmits the optical signals to single main optical fiber 71, respectively, and the optical signals are then transmitted to the light output port 52 via the main optical fiber 71, so as to mate the external optical cable.

At one side of the optical receiving module 30, the optical signals input into the light input port 51 from the external optical cable are introduced into the splitting demultiplexer 60 via the main optical fiber 61. The light signals of different wavelengths are transmitted to the corresponding secondary optical fibers 32 respectively by the splitting demultiplexer 60. The secondary optical fibers 32 correspond to a plurality of first lenses 35 respectively, and in this embodiment the number of corresponding channels is four. The optical signals transmitted by the secondary optical fibers are converted to parallel light by the first set of first lens 351, and transmitted to the reflecting mirror 36 for being deflected by 90 degrees. The deflected optical signals are converged on the photo diodes 31 of the photo diode array via the second set of first lens 352 respectively, and the optical signals are converted to electrical signals by the photo diode 31.

Figure 5:
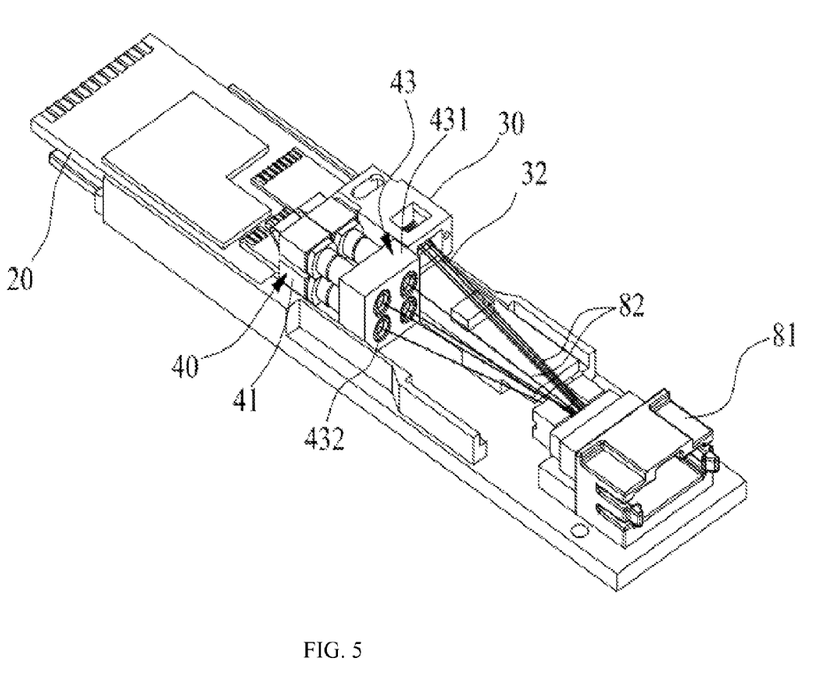
FIG. 5 is a schematic view of a second embodiment according to the present invention.
Figure 6:
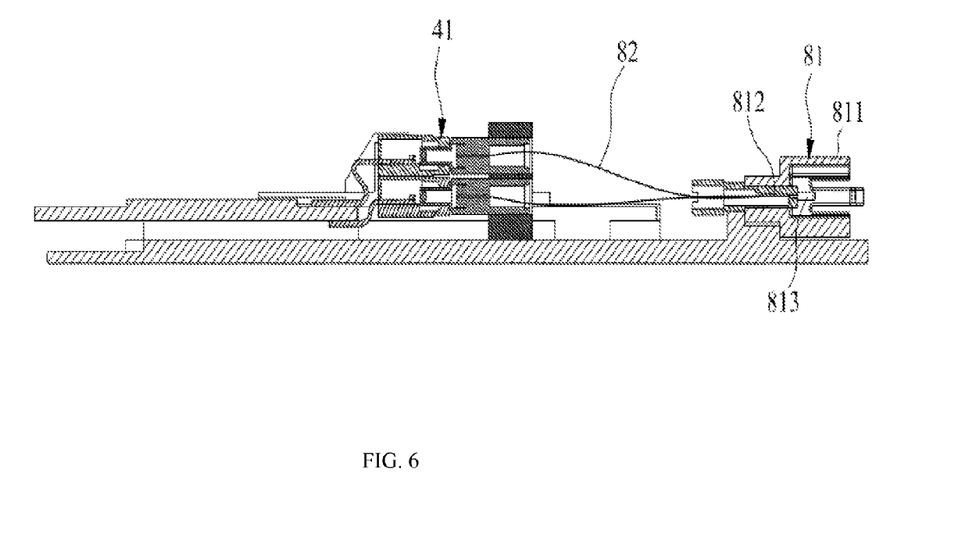
FIG. 6 is a section view of the second embodiment according to the present invention.

Please refer to both of FIG. 5 and FIG. 6 which are schematic view and section view of a second embodiment according the present invention, respectively.

The main difference between optical connectors of this embodiment and the first embodiment is in design of the connector 81. The design of the connector 81 according to this embodiment can save the space occupied by the splitting multiplexer and the splitting demultiplexer. The other parts of this embodiment are the same as that of the first embodiment, so their detail descriptions are omitted. In this embodiment, the design of the connector 81 utilizes technology of multi-channel multiplexing. A plurality of internal optical fibers 82 are connected to the external optical fiber directly to achieve the objective of receiving and transmitting light. The connector 81 is configured with standard of multi-fiber push on (MPO). The connector 81 comprises a connector body 811, a plurality of mating passages 812 disposed in the connector body 811, and a fixing portion 813 disposed at two sides of the mating passage 812. One end of the mating passage 812 is connected to the internal optical fiber 82, and the another end is connected to the external optical cable, so that the signals in a plurality of internal optical fibers 82 are transmitted respectively via different channels to a plurality of single mode optical fibers within the external optical cable. Therefore, the middle distance transmission and long distance transmission can be achieved. The optical fibers in this embodiment are connected one by one in multi-channel way without steps of splitting light or demultiplexing split light, so the material and space of the splitting multiplexer and the splitting demultiplexer can be saved. Besides, the optical signals from the optical sub-assemblies 41 are transmitted by different channels respectively, so the optical sub-assemblies 41 does not need to adjust wavelength of optical output individually.

Figure 7:
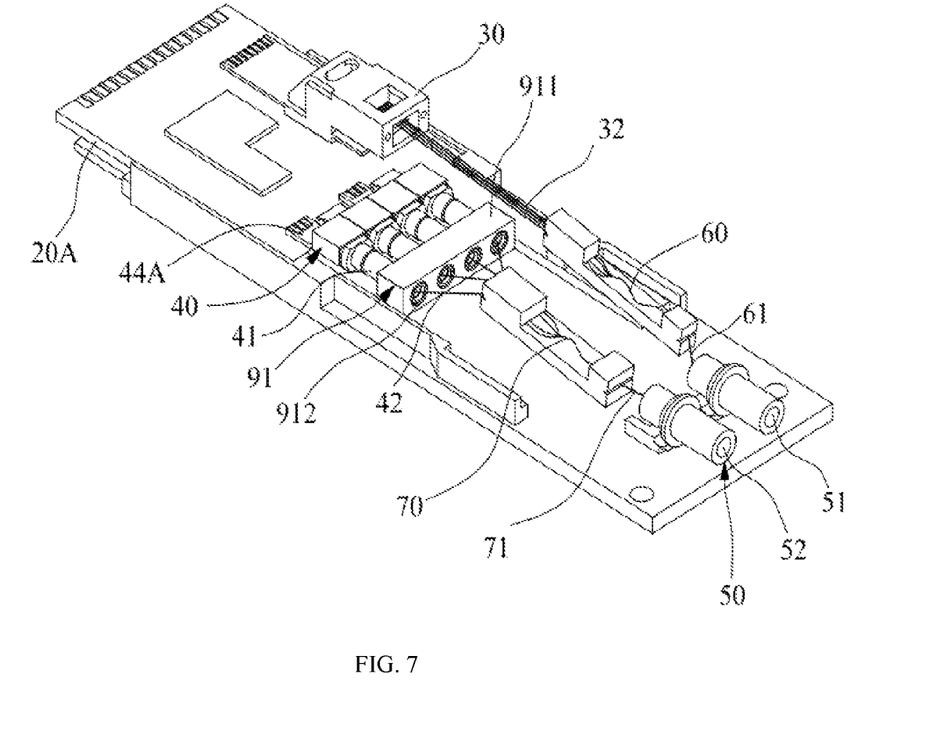
FIG. 7 is a schematic view of a third embodiment according to the present invention.

Please refer to FIG. 7 which is a schematic view of a third embodiment according to the present invention.

The difference between optical connectors of this embodiment and the first embodiment is in the arrangement way of the optical sub-assemblies 41. The other parts of third embodiment are the same as that of the first embodiment, so their detail descriptions are omitted. In this embodiment, the optical sub-assemblies 41 are arranged in a plurality of single rows, and the edge-emitting laser diodes 411 are connected to front surface of the circuit board 20A via a flexible PCB 44A. The positioning mount 91 comprises a base 911, and a plurality of the slots 912 which are disposed on the base 911 in single row and to be inserted by the cylindrical elements 4122 on the optical sub-assemblies 41. By such arrangement, the optical sub-assemblies 41 can be detached independently from the positioning mount 91 respectively, so that the convenience of detaching single optical sub-assembly 41 can be improved.

Figure 8:
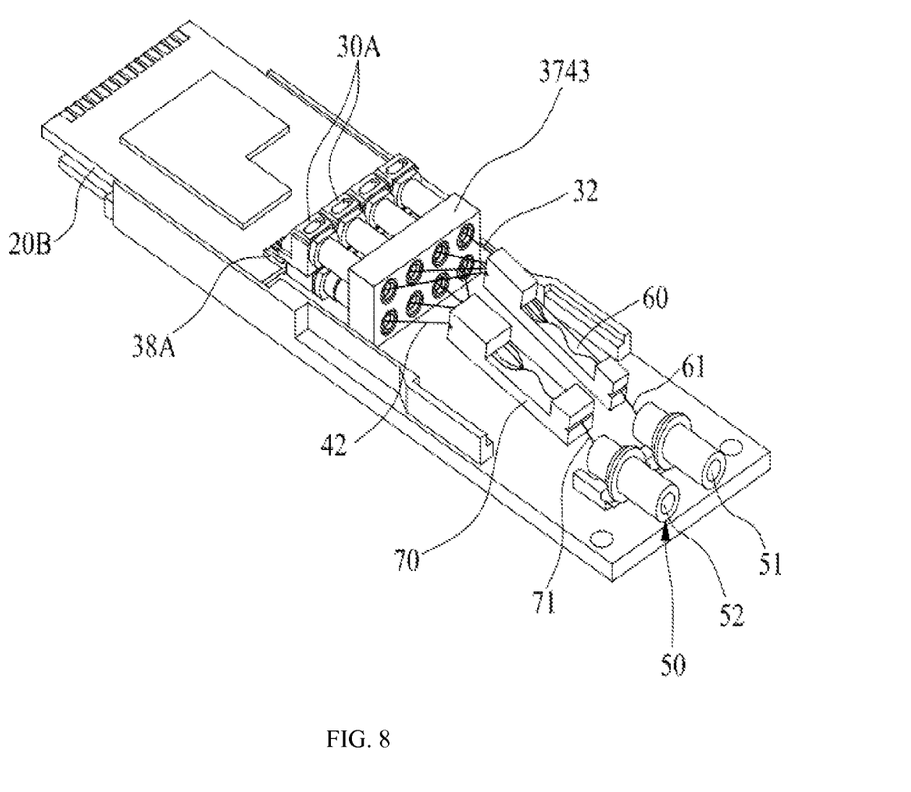
FIG. 8 is a schematic view of a fourth embodiment according to the present invention.
Figure 9:
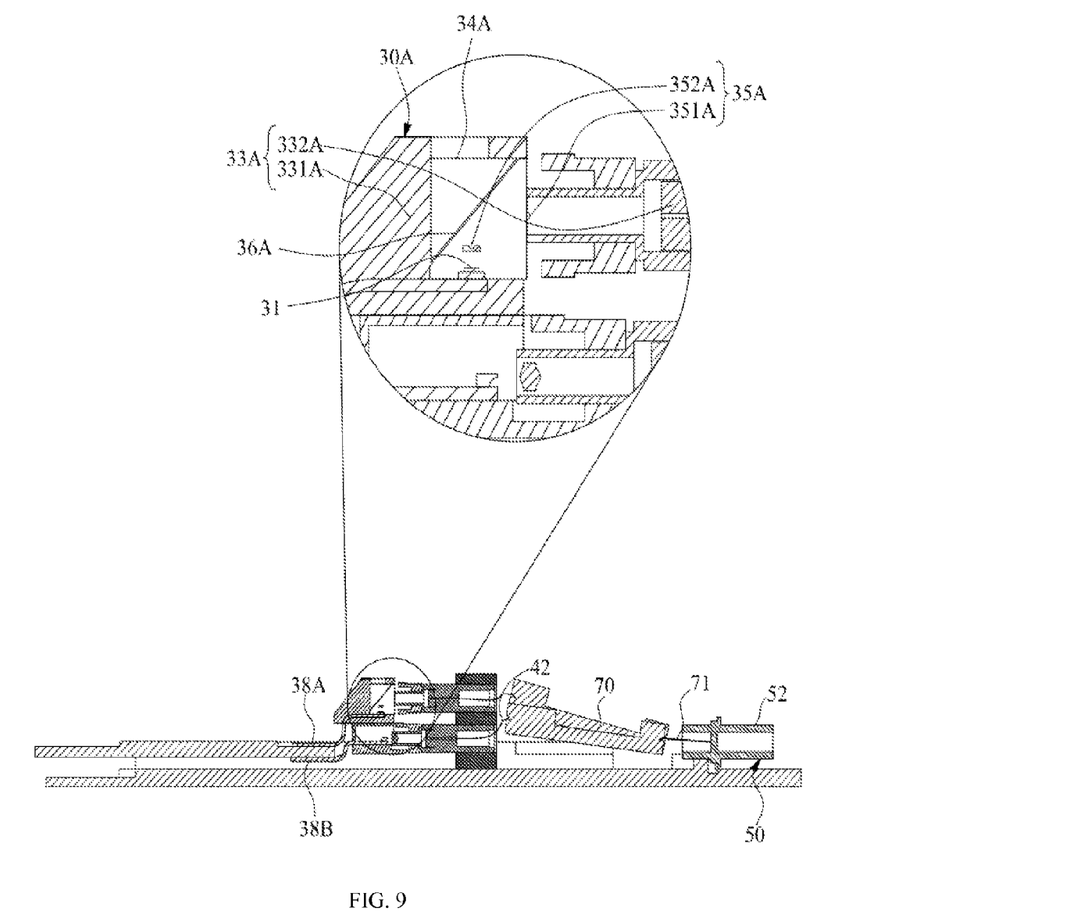
FIG. 9 is a section view of the fourth embodiment according to the present invention.

Please refer to both of FIG. 8 and FIG. 9 which are schematic view and section view of a fourth embodiment according the present invention, respectively.

The difference between optical connectors of this embodiment and the third embodiment is in design of the optical receiving module. The other parts of the fourth embodiment are the same as that of the third embodiment, so their detail descriptions are omitted. The optical receiving module 30A of this embodiment comprises a plurality of photo diodes 31, and a plurality of first covers 33A disposed on the photo diodes 31 respectively. The first covers 33A are disposed above the photo diodes 31 respectively to couple the photo diodes 31 and the secondary optical fibers 32. The first cover 33A comprises a main part 331A disposed above the photo diode 31, a cylindrical element 332A disposed on a side of the main part 331A and connected to the secondary optical fiber 32, a reflecting mirror 36A disposed between the cylindrical element 332A and the photo diode 31. The first lens 35A comprises a first set of first lens 351A disposed between the cylindrical element 332A and the reflecting mirror 36A for converting the diffuse light of the optical signal from the secondary optical fiber 32 into parallel light, and a second set of first lens 352A disposed between the reflecting mirror 36A and the photo diode 31 for focusing the parallel light on the photo diode 31. The optical receiving module 30A overlays above the optical sub-assembly 41 and is connected to the photo diode 31, the circuit board 20B, the edge-emitting laser diode and the circuit board 20B, respectively. In order to enable flexible PCBs make some space for each other, the flexible PCB 38A connected with the photo diode 31 is connected to the front of the circuit board 20B, and the flexible PCB 38B connected with the edge-emitting laser diode 411 is connected to the back of the circuit board 20B. Finally, the positioning mount 3743 for fixing the optical receiving module 30A and the optical sub-assemblies 41 comprises eight slots to be inserted by the cylindrical elements 332A on the optical receiving module 30A and the optical sub-assemblies 41, respectively.

To sum up, the optical sub-assembly of the present invention can be detached independently, so that assembly engineer can replace single optical sub-assembly in failure. Besides, the main part and cylindrical element of the optical sub-assembly of the present invention can be detached individually, so that the cylindrical element provided with the second lens can be recycled for reuse when the edge-emitting laser diode is in failure.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A optical transceiver installed with a replaceable transmitting module, comprising:
   a casing;
   a circuit board, disposed within the casing;
   an optical receiving module, connected with the circuit board, the optical receiving module comprising a plurality of photo diodes or an photo diode array consisted of a plurality of photo diodes, a first cover disposed on the photo diodes respectively or disposed on the photo diode array, one or more first lens disposed on the first cover and corresponding to the photo diodes respectively, and a flexible PCB connected to the photo diode and the circuit board;
   a transmitting module, connected with the circuit board, the transmitting module comprising a plurality of optical sub-assemblies disposed independently respectively, and at least one positioning mount disposed on the casing, the optical sub-assemblies individually comprising at least one edge-emitting laser diode, a second cover disposed on the edge-emitting laser diode, a second lens disposed on the second cover and corresponding to the edge-emitting laser diode, and a flexible PCB connected to the edge-emission laser diode and the circuit board, and the positioning mount comprising a base, and a plurality of positioning portions disposed on the base and fixing the optical sub-assemblies, respectively; and a connector, connected to the optical receiving module and the transmitting module to receive and transmit an optical signal;

wherein the optical receiving module and the transmitting module overlays with each other, and the flexible PCB of the optical receiving module and the flexible PCB of the transmission module connect to the front and the back of the circuit board individually.

2. The optical transceiver according to claim 1, wherein the connector comprises a light input port and a light output port, and the optical receiving module comprises a splitting demultiplexer coupled to the first lens and splitting an optical signal transmitted from the light input port and carrying different wavelength, and transmitting the split optical signal to the photo diode, so that the optical receiving module receives the optical signal.

3. The optical transceiver according to claim 2, wherein the optical receiving module comprises a main optical fiber and a plurality of secondary optical fibers, and two ends of the main optical fiber are coupled to the light input port and the splitting demultiplexer, and the plurality of secondary optical fibers are coupled to the first lens and the splitting demultiplexer, respectively.

4. The optical transceiver according to claim 1, wherein the connector comprises a light input port and a light output port, and the transmitting module comprises a splitting multiplexer coupled to the second lens and transmitting optical signals of different wavelengths from the edge-emitting laser diode to the light output port for transmitting the optical signal.

5. The optical transceiver according to claim 4, wherein the transmitting module comprises a main optical fiber and a plurality of secondary optical fibers, and two ends of the main optical fiber are coupled to the light output port and the splitting multiplexer, and the plurality of secondary optical fibers are coupled to the second lens and the splitting multiplexer, respectively.

6. The optical transceiver according to claim 1, wherein the connector comprises a connector body, a plurality of mating passages disposed on the connector body, and a fixing portion disposed at two sides of the mating passage for positioning an external cable.

7. The optical transceiver according to claim 6, wherein the transmitting module comprises a plurality of internal optical fibers coupled to the second lens and the mating passages, respectively.

8. The optical transceiver according to claim 1, wherein the second cover comprises a main part covering the edge-emitting laser diode and at least one cylindrical element connected to one side of the main part and corresponding to the edge-emitting laser diode, and the at least one cylindrical element is provided with the second lens.

9. The optical transceiver according to claim 8, wherein the main part comprises a first connection part and the cylindrical element comprises a second connection part for being combined with the first connection part correspondingly.

10. The optical transceiver according to claim 8, wherein the positioning portion is a slot for being inserted by the cylindrical element.

11. The optical transceiver according to claim 1, wherein the plurality of first covers of the optical receiving module are disposed above the photo diode array respectively, and the optical receiving module comprises a reflecting mirror disposed on the first cover above the photo diode array, and the reflecting mirror deflects the optical signal from the first lens by 90 degrees and couples the deflected optical signal to the photo diode array.

12. The optical transceiver according to claim 11, wherein the plurality of first covers of the optical receiving module are disposed above the photo diode, and comprise reflecting mirrors disposed on first cover above the photo diode respectively, and the reflecting mirrors deflect the optical signals from the first lens by 90 degrees and couple the deflected optical signal to the photo diode array.

13. The optical transceiver according to claim 11, wherein the optical receiving module comprises a window located on the first cover above the reflecting mirror.

14. A replaceable transmitting module, disposed on a casing of an optical transceiver, the replaceable light emitting module comprising:

a plurality of optical sub-assemblies; overlays with each other and disposed independently respectively, and each of the optical sub-assemblies individually comprising at least one side-emission type laser diode, a second cover disposed on the side-emission type laser diode, a second lens disposed on the second cover and corresponding to the side-emission type laser diode, and a flexible PCB connected to the side-emission laser diode and a circuit board which is disposed within the casing, wherein the plurality of the flexible PCB of the optical sub-assemblies connect to the front and the back of the circuit board individually; and at least one positioning mount, disposed on the casing, the positioning mount comprising a base, and a plurality of positioning portions disposed on the base and fixing the optical sub-assemblies respectively.

15. The replaceable transmitting module according to claim 14, wherein the second cover comprises a main part covering the edge-emitting laser diode, and at least one cylindrical element connected to one side of the main part and corresponding to the edge-emitting laser diode, and the at least one cylindrical element is provided with the second lens.

16. The replaceable transmitting module according to claim 15, wherein the main part comprises a first connection part and the cylindrical element comprises a second connection part for correspondingly being combined with the first connection part.

17. The replaceable transmitting module according to claim 15, wherein the positioning portion is a slot for being inserted by the cylindrical element.

* * * * *